United States Patent
Choi

(10) Patent No.: US 6,786,635 B2
(45) Date of Patent: Sep. 7, 2004

(54) TURBINE BLADE (BUCKET) HEALTH MONITORING AND PROGNOSIS USING NEURAL NETWORK BASED DIAGNOSTIC TECHNIQUES IN CONJUNCTION WITH PYROMETER SIGNALS

(75) Inventor: Sukhwan Choi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/288,296

(22) Filed: Nov. 6, 2002

(65) Prior Publication Data
US 2004/0086024 A1 May 6, 2004

(51) Int. Cl.[7] ........................ G01N 17/00; G01K 13/08; G01K 1/12
(52) U.S. Cl. ........................ 374/153; 374/141; 374/144; 374/45; 374/57
(58) Field of Search ..................... 374/45, 57, 102, 374/104, 103, 137, 141, 144, 152–153, 120–121, 112

(56) References Cited

U.S. PATENT DOCUMENTS

| | | | | |
|---|---|---|---|---|
| 3,584,509 A | * | 6/1971 | Compton et al. | 374/123 |
| 3,592,061 A | * | 7/1971 | Schwedland et al. | 374/144 |
| 3,855,864 A | * | 12/1974 | Douglas | 374/107 |
| 4,648,711 A | * | 3/1987 | Zachary | 356/44 |
| 4,774,149 A | * | 9/1988 | Fishman | 428/680 |
| 5,100,111 A | | 3/1992 | Thomas | |
| 5,211,007 A | | 5/1993 | Marvin | |
| 5,305,599 A | | 4/1994 | Marvin | |
| 5,348,395 A | | 9/1994 | Corr, II et al. | |
| 5,421,652 A | | 6/1995 | Kast et al. | |
| 5,735,666 A | | 4/1998 | Johnston | |
| 5,838,588 A | * | 11/1998 | Santoso et al. | 700/287 |
| 5,840,434 A | * | 11/1998 | Kojima et al. | 428/689 |
| 5,893,047 A | * | 4/1999 | Gimblett et al. | 702/33 |
| 6,109,783 A | * | 8/2000 | Dobler et al. | 374/131 |
| 6,125,105 A | * | 9/2000 | Edwards et al. | 370/230 |
| 6,195,624 B1 | * | 2/2001 | Woodman et al. | 703/7 |
| 6,286,992 B1 | * | 9/2001 | Kyrtsos | 374/45 |
| 6,353,815 B1 | * | 3/2002 | Vilim et al. | 706/15 |
| 6,425,241 B1 | | 7/2002 | Jones et al. | |
| 6,579,005 B2 | * | 6/2003 | Ingallinera | 374/45 |
| 2002/0177985 A1 | * | 11/2002 | Kraft et al. | 703/7 |
| 2003/0120402 A1 | * | 6/2003 | Jaw | 701/29 |
| 2003/0216888 A1 | * | 11/2003 | Ridolfo | 702/181 |

* cited by examiner

*Primary Examiner*—Gail Verbitsky
(74) *Attorney, Agent, or Firm*—Nixon & Vanderhye P.C.

(57) ABSTRACT

Oxidation of turbine buckets may cause unexpected and expensive turbine failures. Turbine bucket oxidation condition may be estimated to predict remaining useful bucket life during operation of a turbine by processing time-varying temperature distributions measured with a pyrometer of at least one rotating turbine bucket.

17 Claims, 7 Drawing Sheets

Generated condition indices (NBD) during service hours.

A turbine blade with oxidation (Bucket A).

Generated condition indices (PT) during service hours.

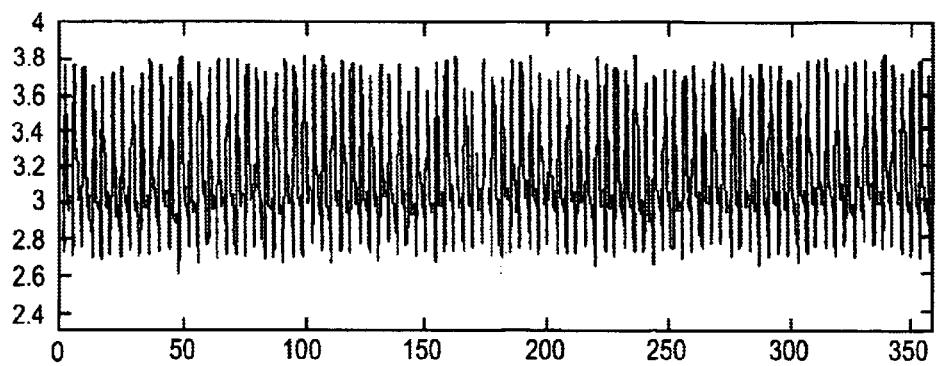
Fig. 1 Collected pyrometer signal during one revolution of turbine.
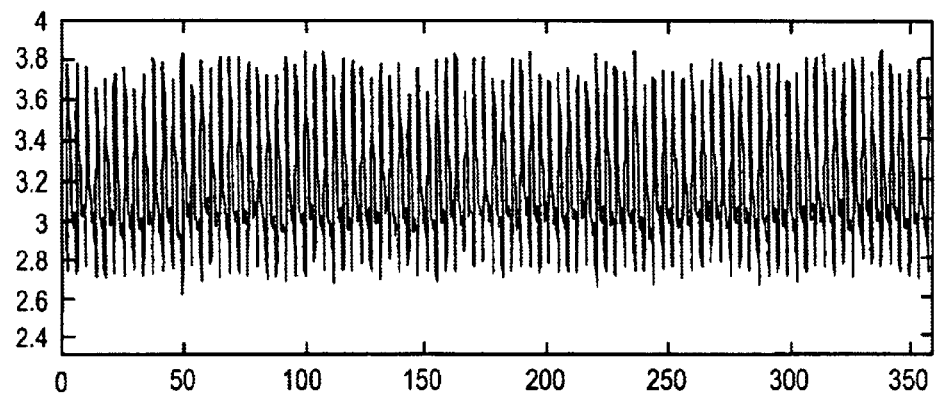
Fig. 2(a) Collected pyrometer signal (a) no oxidation on 11 buckets.
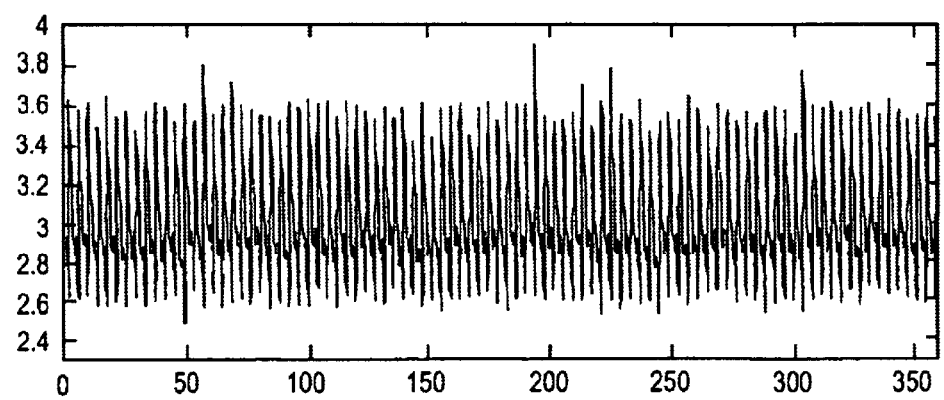
Fig. 2(b) Collected pyrometer signal (b) oxidation on 11 buckets.

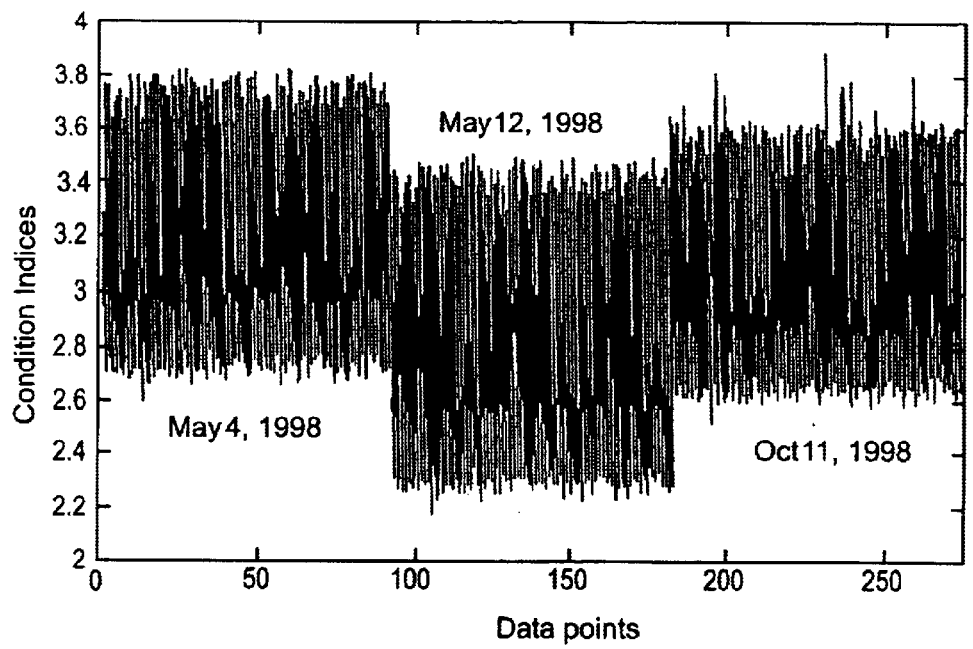
Fig.3 Three groups of pyrometer signal collected at different time.
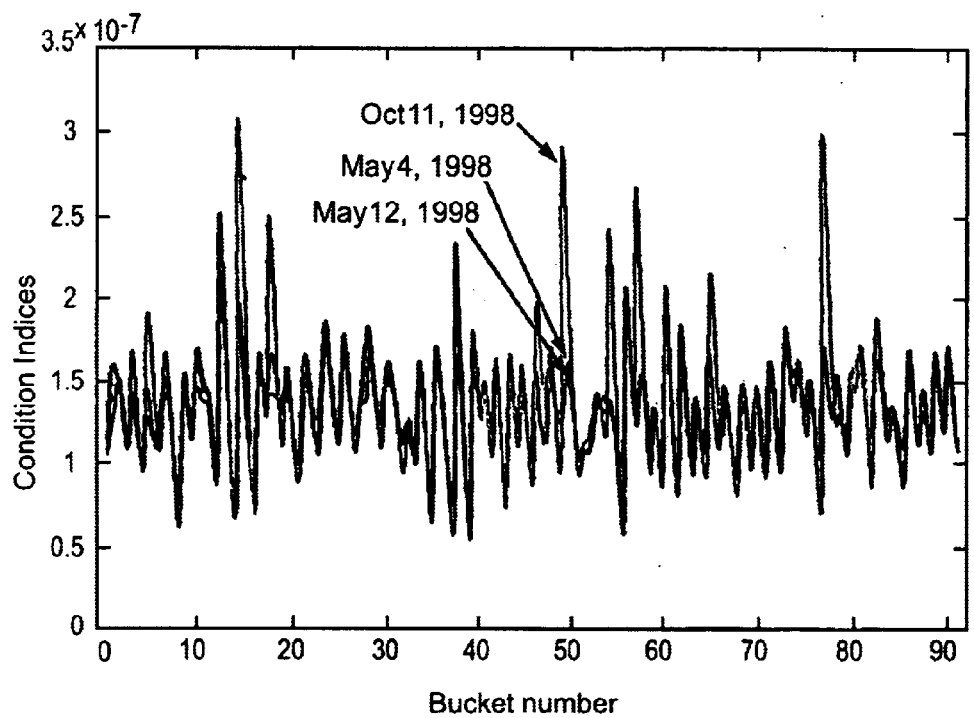
Fig.4 NBD results.

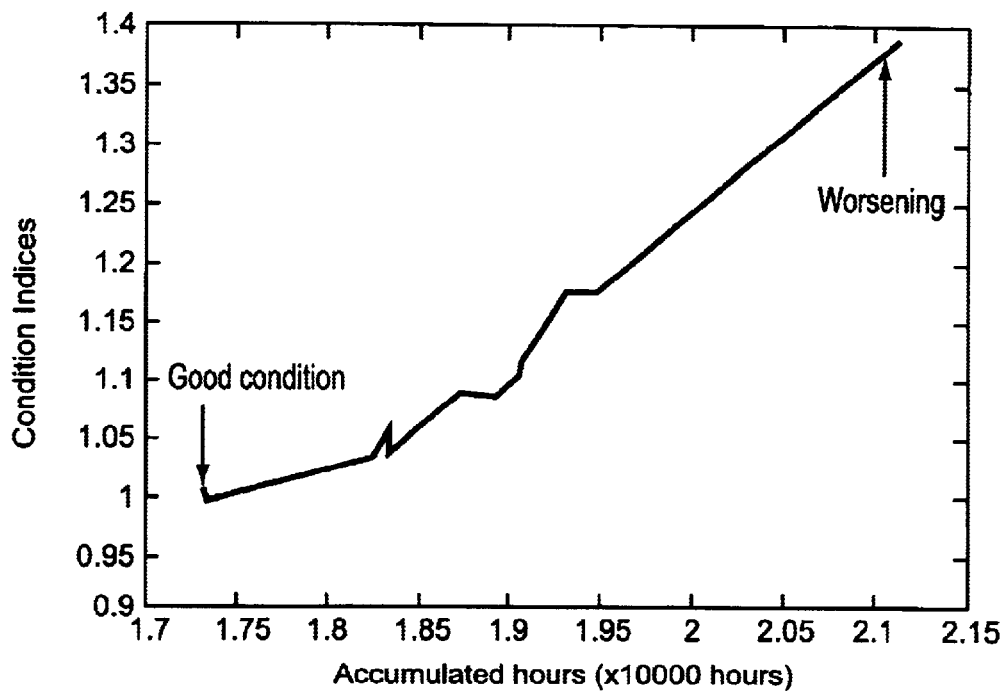
Fig.5 Generated condition indices (NBD) during service hours.
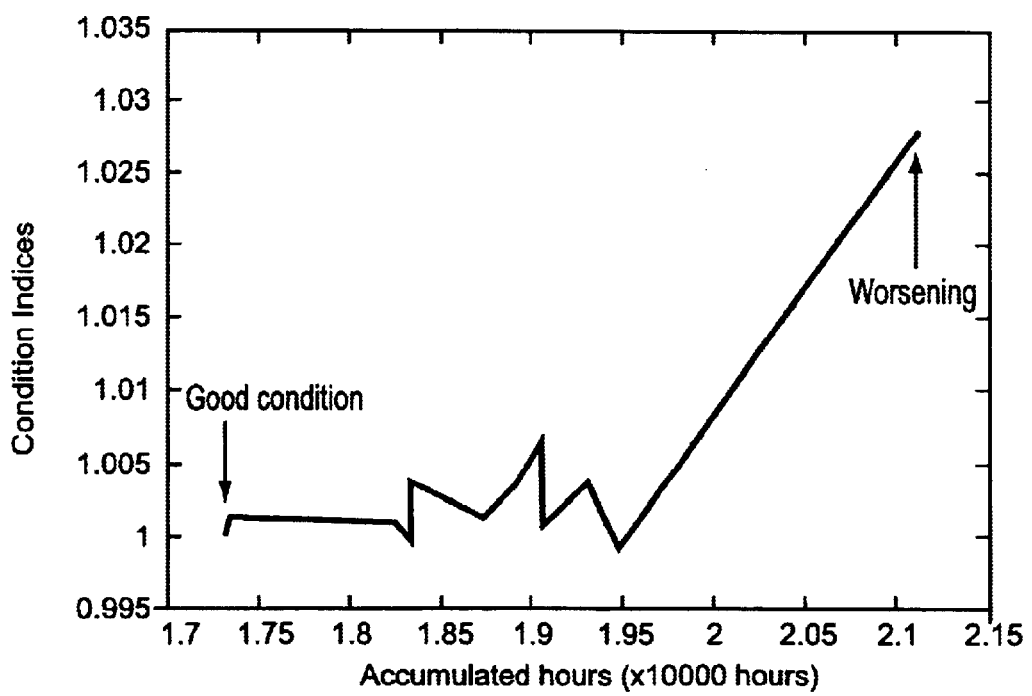
Fig.6 Generated condition indices (PT) during service hours.

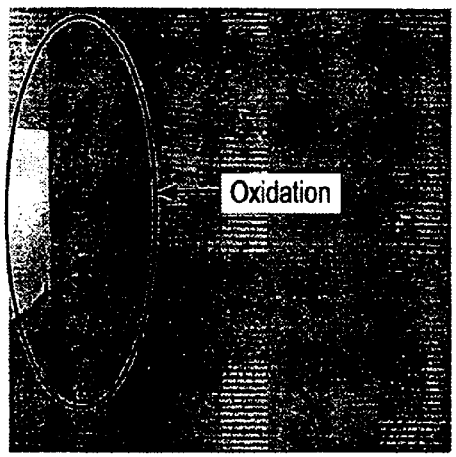
Fig.7 A turbine blade with oxidation (Bucket A).
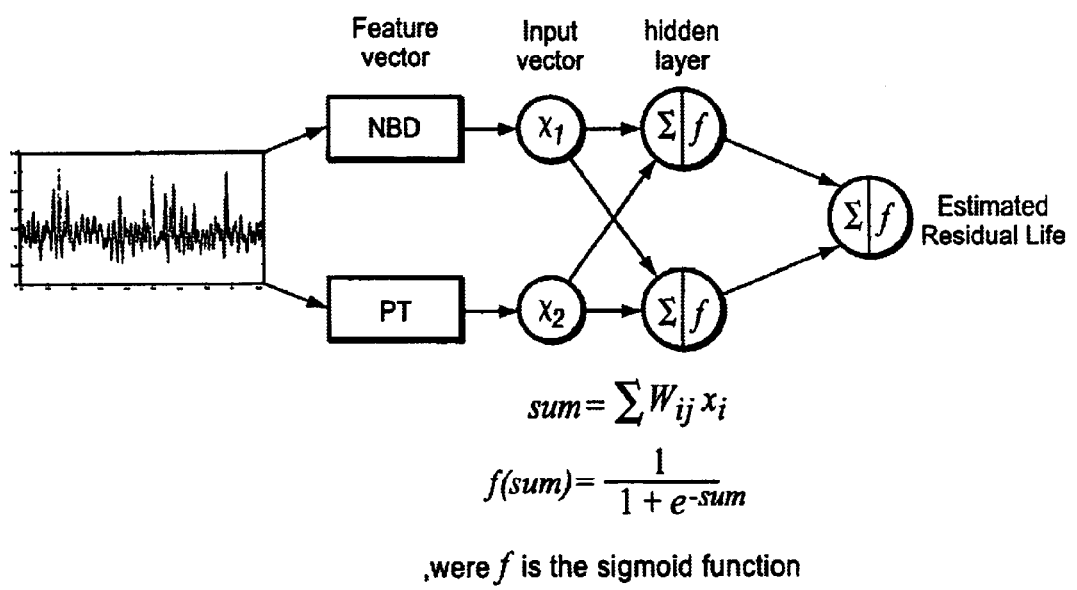
$$sum = \sum W_{ij} x_i$$
$$f(sum) = \frac{1}{1 + e^{-sum}}$$
, were $f$ is the sigmoid function
Fig.8 Residual life estimation scheme.

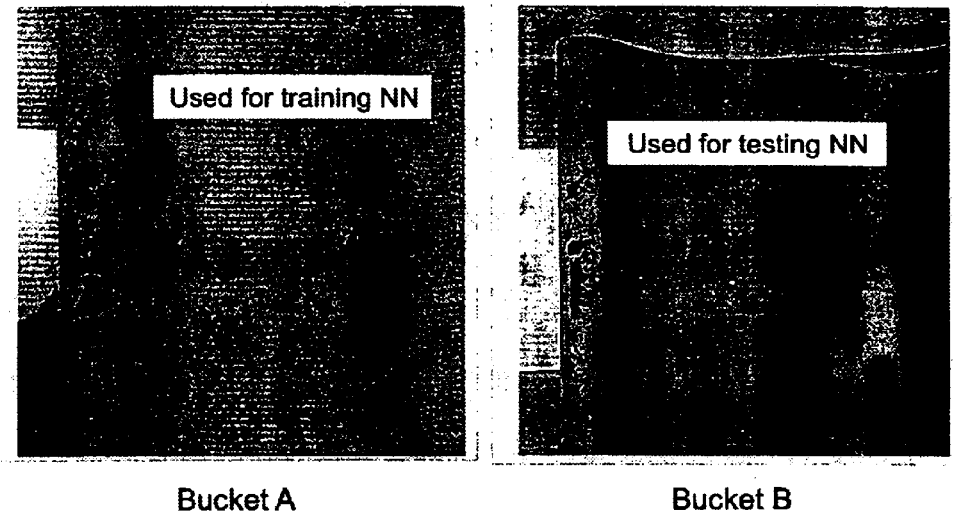
Bucket A
Fig.9(a) Turbine blades with oxidition.
Bucket B
Fig.9(b) Turbine blades with oxidition.
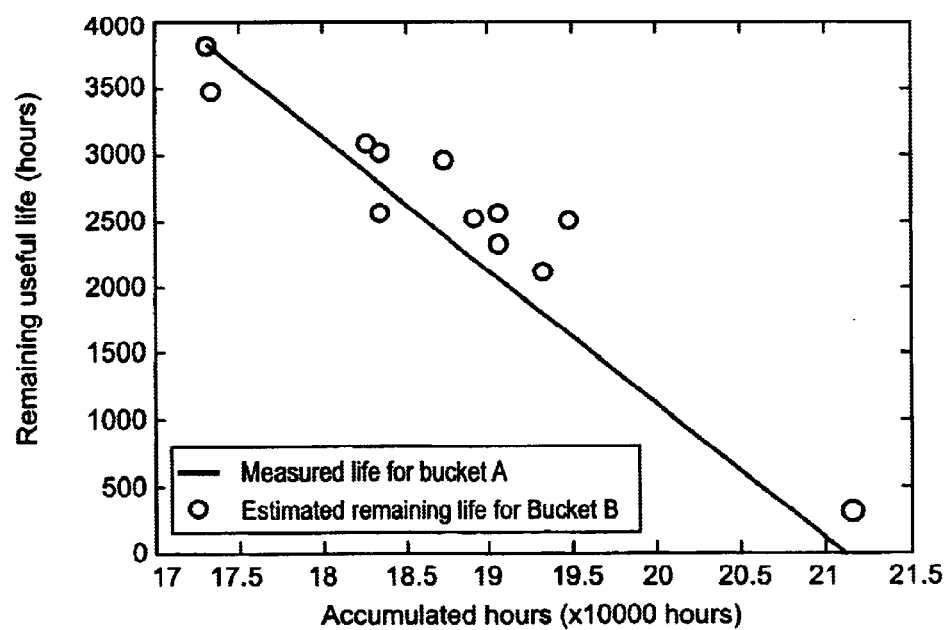
Fig.10 Predicted residual useful life for Bucket B.

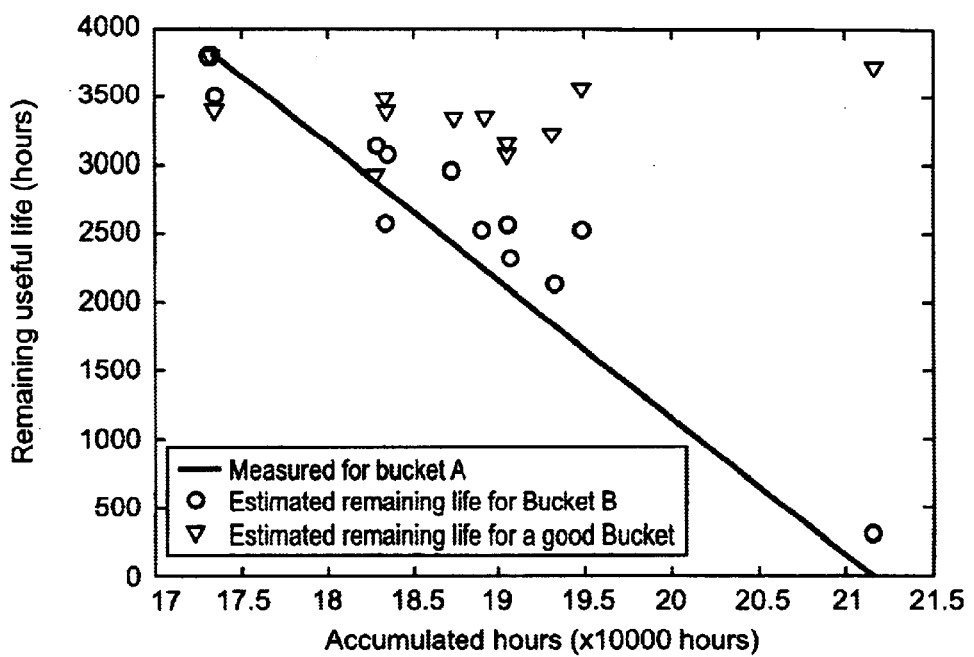
Fig. 11 Predicted residual useful life for Bucket B.

US 6,786,635 B2

TURBINE BLADE (BUCKET) HEALTH MONITORING AND PROGNOSIS USING NEURAL NETWORK BASED DIAGNOSTIC TECHNIQUES IN CONJUNCTION WITH PYROMETER SIGNALS

BACKGROUND OF THE INVENTION

The present invention relates generally to turbine buckets and, more particularly, to a method and system for estimating turbine bucket condition and remaining service life using pyrometer signals as primary input.

Buckets are critical gas turbine components. Unexpected failures of buckets almost always result in high maintenance costs. Typically, potential failures are not directly measurable during turbine operation. The current analytical approach in estimating bucket life due to oxidation requires accurate measurement of absolute bucket metal temperature. However, measurement of accurate "absolute" temperature is not trivial due to many uncertainties including environmental effects, sensor degradation, etc. In addition, this analytical approach cannot detect the presence of defects (oxidation), so there is difficulty in estimating remaining useful life of the bucket.

Optical pyrometers have been used to measure temperature of metal surfaces. Optical pyrometers provide many advantages in determining the spatial and time varying temperature distribution of fast rotating components in gas turbines. Their capability is considered to be limited to the "line of sight (LOS)" which is the optical path of a turbine pyrometer, since the pyrometer measures the temperature only along a small target spot (commonly 1 mm–26 mm).

Previous studies have described the application of a high resolution turbine pyrometer to heavy duty gas turbines, compared the capability of long wavelength infrared pyrometers with short infrared wavelengths, and described the development and evaluation of a versatile high resolution pyrometer system and its application to radial turbine rotor temperature mapping. None of these studies, however, attempts to assess the condition of the bucket using the pyrometer signal.

Researchers have developed a number of diagnostic algorithms and applied them to vibration sensors, such as accelerometers for machinery health monitoring. There is difficulty, however, in detecting the defect (oxidation) using such vibration sensors. Furthermore, none of the researchers has attempted to apply diagnostic techniques to optical sensors, such as pyrometers, for bucket health monitoring.

BRIEF DESCRIPTION OF THE INVENTION

In an exemplary embodiment of the invention, a method of estimating turbine bucket oxidation condition includes (a) measuring, with a pyrometer, time-varying temperature distributions of at least one rotating turbine bucket; and (b) determining a condition index based on the measured time-varying temperature distributions, the condition index reflecting at least one of an overall condition of a bucket set or a specific condition of a single bucket.

In another exemplary embodiment, a method is provided for estimating turbine bucket oxidation condition and predicting remaining useful bucket life during operation of a turbine by processing time-varying temperature distributions measured with a pyrometer of at least one rotating turbine bucket.

In still another exemplary embodiment of the invention, a system for estimating turbine bucket oxidation condition includes a pyrometer that measures time-varying temperature distributions of at least one rotating turbine bucket; and a processor receiving output from the pyrometer. The processor determines a condition index based on the measured time-varying temperature distributions, which condition index reflects at least one of an overall condition of a bucket set or a specific condition of a single bucket.

BRIEF DESCRIPTION OF THE DRAWINGS

FIG. 1 is a graph presenting collected pyrometer data for one turbine revolution;

FIG. 2(a) shows collected pyrometer data on buckets with no oxidation;

FIG. 2(b) shows collected pyrometer data on buckets with oxidation defects;

FIG. 3 illustrates three groups of pyrometer signal data collected at different times;

FIG. 4 shows narrow band demodulation results;

FIG. 5 shows NBD generated condition indices during service hours;

FIG. 6 shows PT generated condition indices during service hours;

FIG. 7 illustrates a turbine blade with oxidation;

FIG. 8 illustrates a residual life estimation scheme;

FIGS. 9(a) and 9(b) illustrate turbine blades with oxidation;

FIGS. 10 and 11 are graphs showing predicted residual useful life for the bucket shown in FIG. 9(b)

DETAILED DESCRIPTION OF THE INVENTION

An objective of this invention is to develop a system and method to estimate bucket oxidation condition and predict remaining useful oxidation life of a bucket, while the turbine is running. The advantage of this approach is that gas turbine maintenance costs can be reduced, and premature bucket failure due to oxidation can be prevented. Comparing with the current analytical approach, this invention does not require accurate absolute temperature measurement to estimate the bucket condition and detect the defect (oxidation) on the bucket. This invention considers only the pyrometer signature itself, since a diagnostic technique will normalize the captured temperature distribution by, for example, extracting relative features from it, or dividing it either by its maximum value or by its root-mean-square value.

Pyrometers can measure time varying temperature distributions of rapidly rotating turbine blades or "buckets" in gas turbines. FIG. 1 presents collected data from a pyrometer for one revolution of the turbine. Each peak in the pyrometer trace represents the passage of a bucket through the pyrometer line of sight. FIG. 2(a) shows all the buckets in good condition, and FIG. 2(b) shows multiple buckets with oxidation.

The oxidation on a bucket is normally not directly measurable for a turbine in service. A diagnostic algorithm is needed for estimating the bucket condition due to oxidation using the pyrometer signal. There are a number of diagnostic algorithms that can be used to produce a condition index (CI), which reflects the overall condition of bucket set, the condition of an individual bucket, or both, depending upon which diagnostic algorithm is applied. For example, root mean square (RMS) gives a single value from pyrometer measurement, which may reflect the overall condition of bucket set, and narrow band demodulation (NBD) produces a time series to give a bucket-to-bucket account of the condition. Therefore, local defects (e.g. oxidation) show up as aberrations at the location on the bucket where the defect (oxidation) occurs.

A peak trace (PT) algorithm can also give bucket-to-bucket account. PT is the ratio of peak (maximum) value within each passage of a bucket to mean of the pyrometer data for one revolution of the turbine. The pyrometer measurements are normalized, and the diagnostic algorithms including NBD and PT are applied to the normalized data.

Figure 12:
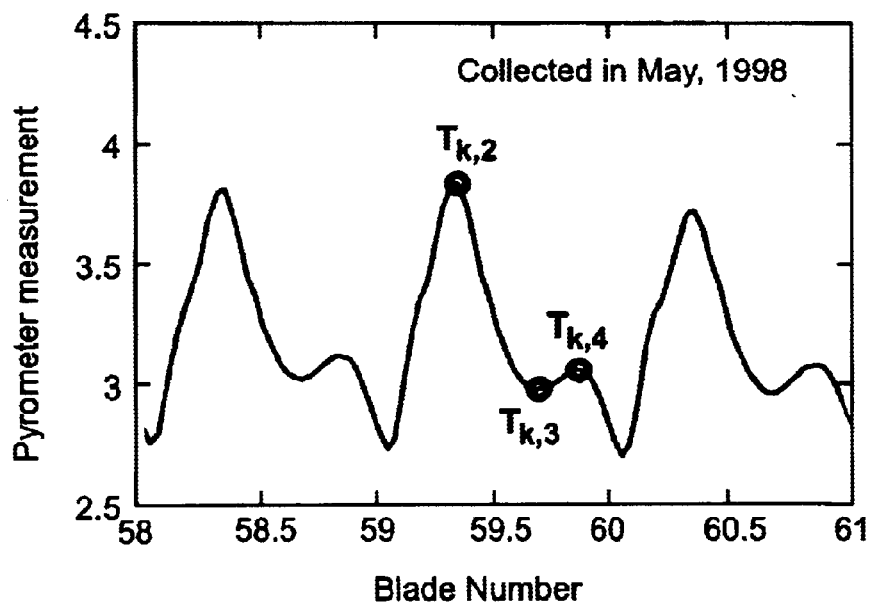
FIGS. 12 and 13 show pyrometer curve temperature measurements.
Figure 13:
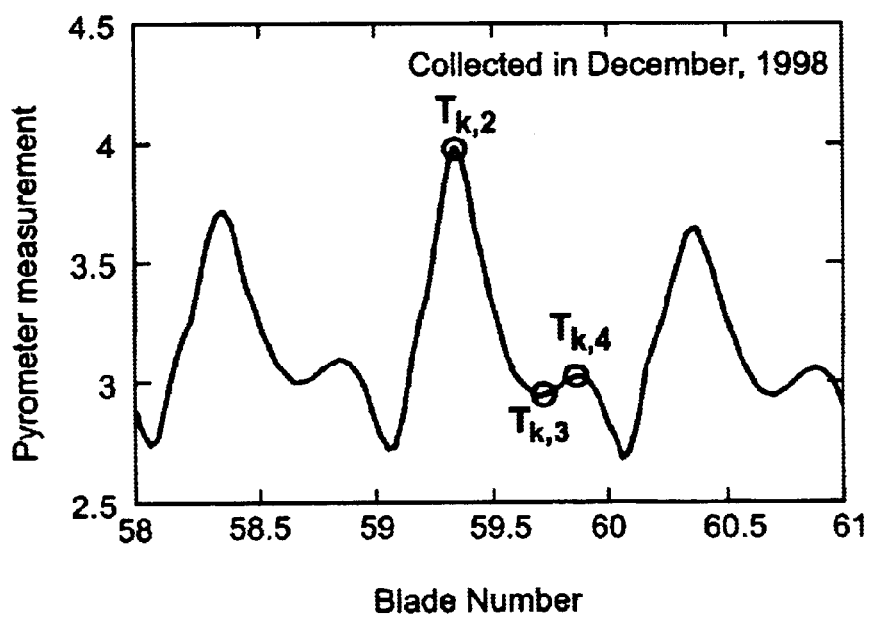

It has been determined that the condition of the blade can be revealed by some critical points (markers) on the temperature curve, the temperature curve representing pyrometer output. With reference to FIGS. 12–13, the peak value of the temperature of blade (k) is closely related to blade conditions. The peak value is represented by $T_{k,2}$. $T_{k,3}$ and $T_{k,4}$ are two stationary points on the temperature curve of the blade (k), relatively independent of blade conditions. In order to compute a condition index ($CI_k$), values for $T_{k,2}$, $T_{k,3}$ and $T_{k,4}$ are determined using polynomial interpolation based on $T_k$. $T_k$ represents the temperature distribution of corresponding bucket number, k, where k indicates the bucket number determined by a provided once per revolution signal from such as tachometer. $D_k$, which is the relative amount of difference between the peak temperature ($T_{k,2}$) and mean of the other two stationary points ($T_{k,3}$ and $T_{k,4}$) is determined according to $T_{k,2}-(T_{k,3}+T_{k,4})/2$. Subsequently, $DD_k$, which is the relative amount of difference between $D_k$ and mean of $D_k$'s from all assumed normal blades, is determined according to $D_k$–Mean ($D_k$ of all normal blades), and the value for $DD_k$ is smoothed with a known smoothing algorithm to obtain $SDD_k$. Finally, the condition index ($CI_k$) is calculated for each bucket according to $CI_k=SDD_k-SDD_{k,ref}$. To determine the normal blades to compute the mean of $D_k$ of all normal blades, a clustering technique is used. In addition, using the mean of $D_k$ of all blades also provided similar degree of capability of separating the blades of different conditions. The output from smoothing (SDD) at the beginning time are taken as the references ($SDD_{k,ref}$) in computing C.I.'s.

FIG. 3 presents arbitrary selected three groups of pyrometer data collected at different time intervals. As shown, the mean value of each group of the data fluctuates over time. These mean shifts, however, are mostly eliminated as shown in FIG. 4. In this Figure, the results from NBD that were applied to the three sets of data are plotted in the same scale. These condition indices for each bucket are collected over the time to be used to determine the bucket condition and its life due to oxidation. FIGS. 5 and 6 show the collected condition indices (NBD and PT, respectively) from a particular bucket (bucket "A") that had oxidation (FIG. 7). From this Figure, condition indices (NBD and PT both) give almost monotonically upward trends over time. If condition indices monotonically increase or decrease over time, tracing these indices enables the determination of time to failure using extrapolation.

The aforementioned bucket condition indices (NBD and PT) can be correlated with the actual amount of oxidation, if inspection data are available, by fusing these indices into a known neural network with the corresponding inspection results. Since these inspection results are not available currently, the condition indices and corresponding remaining life are used to construct a feed-forward neural network (FNN). This scheme is shown in FIG. 8. In this study, the bucket is considered failed when the level of oxidation reaches the condition of the bucket "A" shown in FIG. 7. Although it is somewhat arbitrary, this failure threshold is chosen because the oxidation would deteriorate fast beyond this point. Therefore, the neural network is trained such that bucket life is limited to damage on the bucket "A" shown in FIG. 7.

The trained neural network was tested with another bucket (Bucket 'B'), which had a similar oxidation level to that of Bucket "A," as shown in FIG. 9. Therefore, the neural network estimated remaining life for Bucket 'B' should be similar to that of Bucket "A," if the neural network was well trained. FIG. 10 shows the estimated useful life for Bucket 'B' along with the measured life for Bucket "A," and a good analytical comparison was obtained. The trained neural network was also applied to the normal (no oxidation) bucket for comparison. FIG. 11 shows all the estimated results from the neural network along with the measured residual life for Bucket "A." As seen from this Figure, the bucket in good condition was predicted to have high residual life, unlike the other two buckets with oxidation.

The method and system of the invention can accurately estimate the bucket condition and predict remaining useful bucket life while it is running. Properly integrated neural network and diagnostic techniques utilize the pyrometer measurement as inputs to indicate/estimate the condition of the bucket and predict its remaining life due to oxidation. With this arrangement, turbine maintenance actions or plans can be optimized, and premature bucket failure due to oxidation can be prevented, which can result in a lowering of maintenance costs.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of estimating turbine bucket oxidation condition comprising:
    (a) measuring, with a pyrometer, time-varying temperature distributions of at least one rotating turbine bucket; and
    (b) determining a condition index based on the measured time-varying temperature distributions including a difference between a peak temperature value and a mean temperature value of the at least one rotating turbine bucket, the condition index reflecting at least one of an overall condition of a bucket set or a specific condition of a single bucket.

2. A method according to claim 1, wherein step (b) is practiced by applying a diagnostic algorithm to selected data from the pyrometer.

3. A method according to claim 1, wherein step (b) is practiced according to $CI_k=SDD_k-SDD_{k,ref}$, where k is a bucket number, $SDD_k$ is an output from smoothing, and $SDD_{k,ref}$ is a smoothing reference output.

4. A method according to claim 3, wherein $SDD_k$ is determining by applying a smoothing algorithm to $DD_k$, which is determined according to $DD_k=D_k-Mean_{Dk}$, where $D_k$ is a relative amount of difference between a peak temperature and mean of two stationary points, and $Mean_{Dk}$ is a mean of $D_k$'s of all normal blades.

5. A method according to claim 4, wherein $D_k$ is determined according to $D_k=T_{k,2}-(T_{k,3}+T_{k,4})/2$, where $T_{k,2}$ is a peak temperature value for blade k, and $T_{k,3}$ and $T_{k,4}$ are stationary points on a temperature distribution curve of blade k.

6. A method according to claim 1, further comprising (c) determining a bucket oxidation amount according to a comparison with known inspection data.

7. A method according to claim 6, wherein step (c) is practiced by establishing a feed-forward neural network and defining an oxidation level of a failed turbine bucket.

8. A method according to claim 7, further comprising determining remaining bucket life via the feed-forward neural network according to the bucket oxidation amount.

9. A method of estimating turbine bucket oxidation condition comprising:
 (a) measuring, with a pyrometer, time-varying temperature distributions of a plurality of rotating turbine buckets; and
 (b) determining a condition index based on the measured time-varying temperature distributions, the condition index reflecting at least one of an overall condition of a bucket set or a specific condition of a single bucket by calculating a ratio of a peak temperature value within each passage of one of the plurality of rotating turbine buckets to a mean temperature value of the time-varying temperature distributions of all of the plurality of rotating turbine buckets measured by the pyrometer for one revolution of the turbine.

10. A method of estimating turbine bucket oxidation condition and predicting remaining useful bucket life during operation of a turbine by processing time-varying temperature distributions measured with a pyrometer of at least one rotating turbine bucket, the time-varying temperature distributions including a difference between a peak temperature value and a mean temperature value of the at least one rotating turbine bucket.

11. A method according to claim 10, wherein the step of estimating turbine bucket oxidation is practiced by applying a diagnostic algorithm to selected data from the pyrometer.

12. A method according to claim 11, wherein the diagnostic algorithm is expressed as to $CI_k SDD_k - SDD_{k,ref}$ where k is a bucket number, CI is a condition index, $SDD_k$ is an output from smoothing, and $SDD_{k,ref}$ is a smoothing reference output.

13. A method according to claim 12, wherein $SDD_k$ is determining by applying a smoothing algorithm to $DD_k$, which is determined according to $DD_k = D_k - Mean_{Dk}$, where $D_k$ is a relative amount of difference between a peak temperature and mean of two stationary points, and $Mean_{Dk}$ is a mean of $D_k$'s of all normal blades.

14. A method according to claim 13, wherein $D_k$ is determined according to $D_k = T_{k,2} - (T_{k,3} + T_{k,4})/2$, where $T_{k,2}$ is a peak temperature value for blade k, and $T_{k,3}$ and $T_{k,4}$ are stationary points on a temperature distribution curve of blade k.

15. A method according to claim 10, wherein the step of estimating turbine bucket oxidation is practiced according to a comparison with known inspection data.

16. A method of estimating turbine bucket oxidation condition and predicting remaining useful bucket life during operation of a turbine by processing time-varying temperature distributions measured with a pyrometer of a plurality of rotating turbine buckets, wherein the step of estimating turbine bucket oxidation is practiced by calculating a ratio of a peak temperature value within each passage of one of the plurality of rotating turbine buckets to a mean temperature value of the time-varying temperature distributions of all of the plurality of rotating turbine buckets measured by the pyrometer for one revolution of the turbine.

17. A system for estimating turbine bucket oxidation condition comprising:
 a pyrometer that measures time-varying temperature distributions of at least one rotating turbine bucket; and
 a processor receiving output from the pyrometer, the processor determining a condition index based on the measured time-varying temperature distributions including a difference between a peak temperature value and a mean temperature value of the at least one rotating turbine bucket, wherein the condition index reflects at least one of an overall condition of a bucket set or a specific condition of a single bucket.

* * * * *